(12) United States Patent
Itoh

(10) Patent No.: US 6,996,622 B2
(45) Date of Patent: Feb. 7, 2006

(54) SESSION MANAGING METHOD, SESSION MANAGING SYSTEM, AND PROGRAM

(75) Inventor: Takashi Itoh, Machida (JP)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 10/192,899

(22) Filed: Jul. 11, 2002

(65) Prior Publication Data

US 2003/0033367 A1 Feb. 13, 2003

(30) Foreign Application Priority Data

Aug. 1, 2001 (JP) .............................. 2001-233963

(51) Int. Cl.
*G06F 15/16* (2006.01)

(52) U.S. Cl. ..................................... 709/228; 709/227
(58) Field of Classification Search ................ 709/228, 709/229, 227
See application file for complete search history.

(56) References Cited

U.S. PATENT DOCUMENTS 5,809,495 A * 9/1998 Loaiza .......................... 707/2
5,826,076 A * 10/1998 Bradley et al. ................ 707/4
5,930,772 A * 7/1999 Gomyo et al. ................ 705/30
6,138,142 A * 10/2000 Linsk .......................... 709/203
6,748,448 B1 * 6/2004 Barrera et al. .............. 709/245

FOREIGN PATENT DOCUMENTS

| JP | 10-074153 | 3/1998 |
|---|---|---|
| JP | 11-212912 | 8/1999 |
| JP | 11-296456 | 10/1999 |
| JP | 2000-207365 | 7/2000 |
| JP | 2000-330957 | 11/2000 |
| JP | 2002-366517 | 12/2002 |

* cited by examiner

*Primary Examiner*—Rupal Dharia
*Assistant Examiner*—Brian J. Gillis
(74) *Attorney, Agent, or Firm*—A. Bruce Clay

(57) ABSTRACT

A server issues a virtual directory name at the beginning of a session, and a client redirects to a page at or below the virtual directory name. The server changes the virtual directory name to a physical name during the tracking in the session, and implements a method to a resource specified by the physical directory name. If necessary, the server identifies the user having an access under the virtual directory name when implementing the method. When the user moves within the physical directory structured to be present at or below the virtual directory (that is, during the session management), the user moves from one link to another by a relative path.

9 Claims, 9 Drawing Sheets

SESSION MANAGING METHOD, SESSION MANAGING SYSTEM, AND PROGRAM

DETAILED DESCRIPTION OF THE INVENTION

The invention relates to a session managing method and a session managing system over an internet as well as a program, and more particularly to a technique effectively adapted to a method for readily achieving user identification or session management without increasing a page size or burdens of a site producer even in an environment where existing user identification or session managing method, such as cookies, is unavailable.

BACKGROUND OF THE INVENTION

HTTP (Hypertext Transfer Protocol) used as the standard in transferring a page file written in a page description language, such as HTML (Hypertext Markup Language), is a protocol that closes transactions for each request (processing request) from a client system. In other words, because there is no concept of a continued session, it cannot handle a series of requests by associating one with another. In the case of a simple request asking a server to distribute news, provide products information, etc., the processing may be completed by merely sending the contents (page file) back to the client that originated the request. However, in order to achieve a shopping cart function in a shopping site or a function of customizing a Web page to individual users, there is a need for user (viewer) tracking management during manipulations over a plurality of pages. In other words, it is necessary to introduce a concept of session management by tracking a user in some way.

An IP (Internet Protocol) address, for example, may be used in identifying the client that originated a request. However, nowadays it is general to use address converting means, such as NAT (Network Address Translator), a proxy server, and a gateway, and it is doubtful whether the client at the IP address is really the client that originated the request.

Hence, a session managing method using cookies is generally adopted. Cookies are information files for recording information sent from a Web site to a client's end into a hard disc or the like in the client system. At the beginning of a session, the Web site issues identification information, such as a session ID, to the client, and the browser at the client's end records the identification information into a cookie. When the client accesses again the Web page that issued the cookie, the information saved in the cookie is sent to the Web site. This enables the Web site (server's end) to implement session management or customization to individual users by using the cookie information.

However, in order to use cookies, the client system on which the browser is run needs to have a sufficient record region (hardware resource), such as a personal computer. Thus, for example, a portable terminal, such as a cellular phone, having an insufficient memory region may not be able to use cookies. Also, some browsers are not provided with a function for cookies. Further, the user may switch off cookies. More specifically, a server sends information to cookies without the user's knowledge or permission and uses this information. Hence, some users do not wish to use cookies due to privacy and security concerns. Thus, the user may inhibit the use of cookies by the user-defined browser.

When cookies are unavailable, it is impossible to make a page design at a Web site based on an assumption that cookies are available. Thus, there is need for a page design based on the assumption that cookies are unavailable. The following are methods known as a technique for session management under HTTP without using cookies.

One is a method for implementing session management at the Web application level. An example would be a method for passing on session information as a CGI (Common Gateway Interface) parameter each time the user moves from one page to another. To be more specific, a session ID is generated at the login, and this session ID is redirected to a first page as a parameter. The CGI receives the session ID passed as a parameter, and a program at the server's end connected by the CGI dynamically creates a page including a hyperlink having embedded the session ID. Because the hyperlink included in the page thus created includes the session ID as the CGI parameter, the session ID is passed on to another page as the user moves to another link (hyperlink choosing operation). In this manner, a unique session ID is held along a series of link-to-link movements, which makes it possible to implement the user tracking management by referring to the session ID whenever necessary.

A second method incorporates passing a session ID as a basic function of the Web server. To be more specific, it is a method for appending identification information (session ID) at the end of a URL (Uniform Resource Locator) of a hyperlink and automatically extracting the identification information at the Web server. Web servers, such as Apache Web servers, are designed so that a Web page is constructed by using a Java (trademark of Sun Microsystems) servelet. These servers are furnished with a function of embedding a session ID at the end of the URL of a link destination and extracting the session ID from the URL when accessing a page, that is, a URL rewriting function. By using the URL rewriting function, it is possible to pass on the session ID from one linked page to another in the same manner as the first method, and a Web application can be run without concern for the passing of the ID session.

As described above, it is possible to implement session management by adopting either of the methods even in an environment where cookies are unavailable. However, these existing methods have problems as follows.

First, both methods need a page design made on the proposition that a technique furnished with a function achieving these methods is adapted. For example, in the case of the first method, it is necessary to design a page so that a CGI parameter can be passed on. In the case of the second method, the use of JSP (Jave Server Pages) is a proposition because the URL of a link destination has to return a value of an Encode URL function. When a Web site is already constructed with static pages, these pages have to be reconstructed on the proposition that a technique achieving either method is adapted, which increases the burden of a page designer.

Second, both methods need to create a page dynamically at the server's end in order to pass a session ID to a linked page. To be more specific, a dynamic page has to be created for each request even if a page does not need the processing for individual users, such as a simple page like a table-of-contents page and a products introduction page, that is, a page that can serve its purpose satisfactorily as being a static page. Handling a dynamic page has disadvantages as follows. That is, because a dynamic page is created for each request, a load on the page-creating server is increased. Also, because the session ID is included in each link in the page, the page size is increased. For example, given 30 bytes as the size of the session ID, then, if there are 10 links in one page, the page size is increased by 300 bytes, and if there are 100 links, the page size is increased by 3000 bytes. If a user bears a communications charge for a page download, such an increase in the page size adversely affects the charging status of the user, and it could hamper convenience of users.

Third, when a user terminal is, for example, an i-mode cellular phone, neither a session ID is sent in an unofficial site, nor is a cookie available. Hence, in order to implement session management with a terminal of this kind, the first or second method needs to be adopted. However, because an i-mode terminal has to use compact HTML, which is a subset of HTML, a page size is too small to use the existing method with ease, thereby presenting a high hurdle. Hence, there is a need for a simpler session managing method.

The invention is addressed to provide an extremely simple session managing method, a session managing method capable of using a static page, a session managing method for minimizing burdens in reconstructing an already constructed Web site, a session managing method for reducing a load to the server, a session managing method that does not increase a page size of a Web page, and a session managing method that can be readily achieved in a function-limited environment, such as an i-mode portable terminal.

SUMMARY OF THE INVENTION

According to the session managing method of the present invention, a server issues a virtual directory name at the beginning of a session, and a client redirects to a page at or below the virtual directory name. The virtual directory is not actually present, and a physical directory is made present in another directory within the server. A page is constructed so that the user moves within the physical directory at or below the virtual directory during the tracking in the session, thereby making it possible to identify the user having an access under the virtual directory name. Herein, when the user moves within the physical directory structured to be present at or below the virtual directory (that is, movements during the session management), the user moves from one link to another by a relative path. In other words, it seems as if each user refers to a file positioned at a different path (in a different virtual directory), but in actual, each user refers to a file below the physical directory having the same path structure. Consequently, not only can a simple static page be used as a file at or below the physical directory within the server, but also the user tracking management can be implemented by referring to the virtual directory.

The inventions are as follows. A session managing method performs processing to a resource on a network, including: a step of receiving a request for the processing from a user system; a step of deciding whether a virtual directory name is included in a resource that becomes an object of the request; a step of replacing the virtual directory name with a physical directory name recorded in association with the virtual directory name when the virtual directory name is decided as being included in the deciding step; and a step of sending a result of the processing to the resource replaced by the physical directory name back to the user system as a response, wherein, when necessary, one or both of user identification information and session identification information recorded in association with the virtual directory name are referred to when the response is generated. Also, the method further includes, as a proposition, a step of starting a session in response to a request from the user system, wherein the session starting step includes: a step of issuing a virtual directory name other than an already issued virtual directory name; a step of recording, by associating one with another, one or both of the session identification information and the user identification information, the virtual directory name, and the physical directory name having recorded a resource that should respond to the request when the session is started; a step of replacing the physical directory name with the virtual directory name; and a step of generating a response including location information of the resource replaced by the virtual directory name, wherein the user system having received the response including the location information redirects to the resource specified by the location information. According to this session managing method, the user can be identified by a virtual directory that varies from user to user, which makes it possible to implement the user tacking management in a session. By using the virtual directory as the session managing information, it is no longer necessary to construct a dynamic page on the proposition that the CGI or JSP is used, and a static page can be used for a simple page that needs the session management.

Alternatively, a session managing method of the invention performs processing to a resource on a network, including: a step of receiving a request for the processing from a user system; a step of deciding whether a virtual directory name is included in a resource that becomes an object of the request; a step of replacing the virtual directory name with a physical directory name recorded in association with the virtual directory name when the virtual directory name is decided as being included in the deciding step; a step of appending a cookie to the request, the cookie varying with each user system and being recorded in association with the virtual directory name; a step of sending the request having the resource thereof being replaced by the physical directory name and appended with the cookie to a server holding the resource; a step of receiving a response to the request from the server; a step of updating the cookie when the response includes a request to rewrite the cookie; and a step of sending the response to the user system. Also, the session managing method further includes, as a proposition, a step of starting a session in response to a request from the user system, wherein the session starting step includes: a step of issuing a virtual directory name other than an already issued virtual directory name; a step of generating the cookie that varies with each user system in association with the virtual directory name; a step of replacing the physical directory name having recorded a resource that should respond to the request when the session is started with the virtual directory name; and a step of generating a response including location information of the resource replaced by the virtual directory name, wherein the user system having received the response including the location information redirects to the resource specified by the location information. This session managing method can be achieved by, for example, a proxy server or a gateway. The session management with a terminal having no cookie is implemented at a request from such a terminal by using the virtual directory in the same manner as above. In this case, a cookie is defined inside the proxy server or the like, and a cookie unique to each session is managed. By adopting this method, it is possible at a Web server to construct a page on the proposition that cookies are available, and a terminal that cannot use a cookie is able to receive services from a Web server already constructed on the proposition that cookies are available.

In the session managing methods described above, the virtual directory name may uniquely represent one particular user system during a predetermined effective period. Also, a direct access from outside the resource under the physical directory name may be restricted. According to these arrangements, it is possible to achieve a flexible operation, such as allowing a session to continue within an effective period by recording a URL including the virtual directory in, for example, the "Bookmark" or "Favorite" folder. Also, because one virtual directory is secured for one user, by giving a name that cannot be readily figured out by a third party to the virtual directory, it is possible to restrict an intentional or accidental access by any other user.

Also, link information included in the resource under the physical directory name may be written by using a relative path. Accordingly, the physical directory at or below the virtual directory can be constructed without taking the session information into account, which can reduce the burden of a designer.

DETAILED DESCRIPTION OF THE INVENTION

Figure 1:
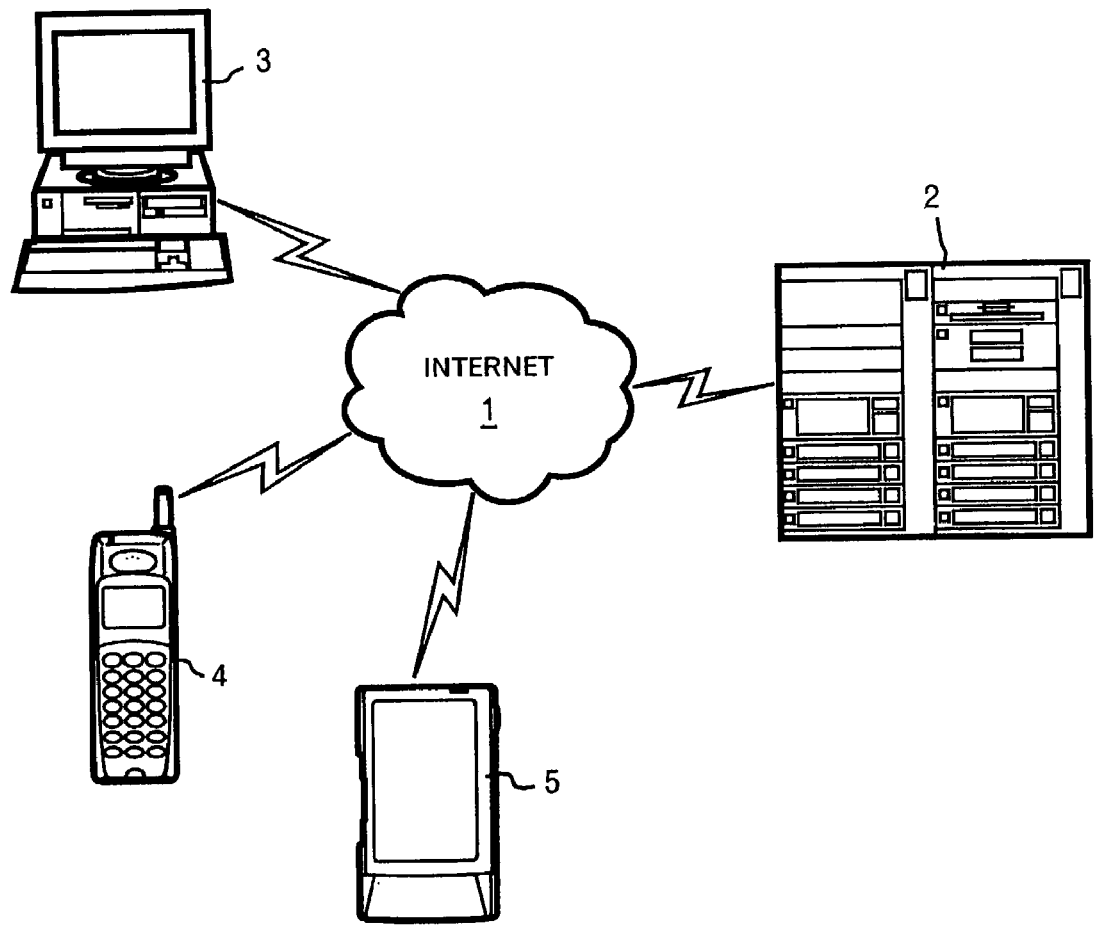
FIG. 1 is a conceptual view of an example of a network system to which a session managing method of a first embodiment of the invention is applicable.

The following will describe in detail the embodiments of the invention with reference to the accompanying drawings. It should be appreciated, however, that the invention can be modified in various manners, and is not limited to the description of the embodiments below. Also, like components are labeled with like reference numerals in all the embodiments below.

In the embodiments below, an explanation will be given chiefly to a method or a system. However, it is obvious to anyone skilled in the art that the invention can be implemented as a computer-executable program. Hence, the invention can be achieved as hardware, software, or a combination of software and hardware. The program can be recorded into an arbitrary computer-readable medium, such as a hard disc, a CD-ROM, an optical storage device, and a magnetic storage device.

Also, in the embodiments below, a general computer system can be used as a system of a Web server or a proxy server. A computer system applicable in the embodiments below is provided with hardware resources generally provided to a computer system, such as a central processing unit (CPU), a main storage device (main memory: RAM), a non-volatile storage device (ROM), a co-processor, an image accelerator, a cache memory, and an input/output control device (I/O). Also, the computer system is provided with an external storage device, such as a hard disc device, and communications means connectable to a network, such as an internet. The computer system includes various kinds of computers, such as a personal computer, a workstation, and a mainframe computer.

FIG. 1 is a conceptional view showing an example of a network system to which a session managing method according to one embodiment of the invention is applicable. The network system shown in the drawing is arranged in such a manner that a server system 2, and a computer system 3, a cellar phone 4, and a PDA (Personal Digital Assistant) 5 each of the latter three serving as a client are connected to an internet 1.

The internet 1 establishes a communications connection in a transport layer between systems under TCP/IP (Transmission Control Protocol/Internet Protocol), for example. In the present specification, the internet includes an intranet forming a private network for a company or group. Also, HTTP explained below is generally used on the TCP/IP, but the TCP/IP is not a proposition if a sufficiently reliable transport layer can be formed. Hence, the use of the internet 1 is not a proposition for the session managing method of the invention. The internet 1 is an example of a network system suitable in achieving the session managing method of the invention, and the transport layer may be formed by any other protocol. In the present specification, HTTP includes HTTPS.

The server system 2 is an information processing system for implementing certain processing (method) upon receipt of a request from a client, such as the computer system 3, and sending the result back to the client as a response. In the case of HTTP explained as an example in the present embodiment, the server system 2 is furnished with a Web server function, such as Apache, and is also furnished with a function of achieving the session managing method of the present embodiment, which will be described below. The number of the servers is not limited to the number specified in the drawing. The server system may be achieved as a single hardware system, or may be achieved by a plurality of hardware systems in a distributed fashion.

The computer system 3, the cellular phone 4, and the PDA 5 are client systems that originate a request to the server system 2, and receive a response from the server system 2. The computer system 3, the cellular phone 4, and the PDA 5 are furnished with a user agent function of analyzing the contents of an entity body, such as HTML, included in the response, and then displaying the result. A typical example of the user agent would be a Web browser. The computer system 3, the cellular phone 4, and the PDA 5 are examples of the client, and any other kind of information equipment may function as a client as well. Also, the number of the client systems and the server systems is not limited to the number specified in the drawing.

The client systems (computer system 3, cellular phone 4, and PDA 5) may be provided with a typical Web browser, or a dedicated or general-purpose browser capable of displaying a compact HTML text like an i-mode cellular phone. The session managing method of the present embodiment is useful when applied to a client system with a poor hardware resource, such as the cellular phone 4 or the like that cannot use cookies. However, the method of the present embodiment can be applied to a client system whether cookies are available or not. Hence, it should be understood that the invention is not limited to a client system that cannot use cookies. In other words, any system capable of originating an HTTP request and processing a response can serve as a client system of the invention.

In the embodiment, a browser will be explained as an example of the user agent in the client system. However, the user agent is not limited to a browser, and includes the overall software or system at the HTTP client's end.

An illustration of FIG. 1 and the following description omit an explanation as to communications connecting means between the internet 1 and the server system 2, the computer system 3, the cellular phone 4, and the PDA 5. However, it is needless to say that general connecting means, either a hardware or software version, is employed. Also, the communications connecting means establishes a connection either via a wireless communication or a cable.

Figure 2:
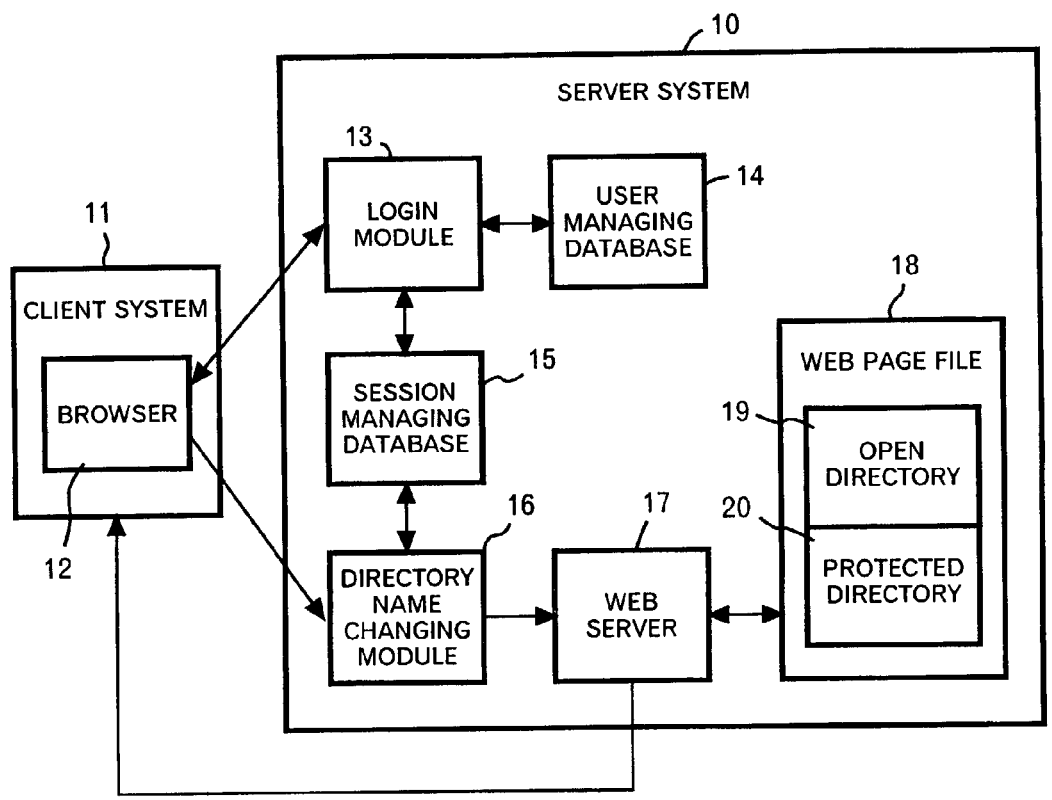
FIG. 2 is a block diagram showing a function of an example of a client system and a server system applicable in a session managing system of the first embodiment.

FIG. 2 is a block diagram showing functions of an example of the client system and the server system applicable to a session managing system of the present embodiment. A server system 10 and a client system 11 shown in the drawing are arranged as follows.

The server system 10 includes a login module 13, a user managing database 14, a session managing database 15, a directory name changing module 16, a Web server 17, and a Web page file 18. The client system 11 includes a browser 12.

As described above, the browser 12 is furnished with a function of analyzing a text written in the page description language, such as HTML, and displaying the result. Also, it implements an HTTP method, such as an obtain request for a specified resource, when the user chooses hyperlinks embedded in a page by, for example, anchor tags. Also, it is furnished with a function of receiving a program, such as a Java applet, and running the program if the environment is ready for implementation.

The login module 13 handles session starting processing described below upon receipt of a login request from the client system 11. Also, it authenticates the user identification when necessary, and starts a session only when permitted. Authentication of the user identification is not a must in the invention. A session can be started unconditionally without authenticating the user identification.

The user managing database 14 records user ID and password used when authenticating the user identification. Alternatively, it may additionally record information of users.

Although it will be described below, the session managing database 15 records a virtual directory created at the beginning of a session in association with a session ID. Also, the session ID records a physical directory that has actually recorded a file the user will refer to in association with the virtual directory. The virtual directory is an imaginary directory created for a particular session and is not actually present. However, as will be described below, the server having received a request behaves as if such a directory were actually present when viewed from the user. The session managing database 15 may record the user ID in association with the session ID.

The directory name changing module 16 is furnished with a function of receiving a request from a user and changing a directory name of a resource included in the request. The directory name included in the request from the user is a virtual directory name as will be described below. The directory name changing module 16 detects a portion corresponding to the virtual directory name, and changes the same to a physical directory name. The directory name changing module 16 refers to the session managing database 15 when changing the virtual directory name to the physical directory name. To be more specific, it obtains the physical directory name associated with the virtual directory name included in the received request by searching through the session managing database 15, and replaces the portion corresponding to the virtual directory name with the physical directory name thus obtained by the search.

The Web server 17 is a software group composed of various kinds of components achieving a typical Web server function, such as Apache. As is well known, it receives a request from the user, and, with respect to a resource included in the request, implements a method specified by the request (for example, in the case of a GET method, it reads out the resource and sends the same back to the user). Herein, it is needless to say that the Web server 17 is furnished with a function of generating parameters of various kinds to be included in the header. Also, it may be furnished with a function of generating a dynamic file by running a program through the CGI.

The Web page file 18 is an actual resource that becomes an object of a method at a request from the user. For example, it is a file written in the page description language, such as HTML and XML. The Web page file 18 includes a part of a page, such as an image file used in a Web page, and a program like a Java applet. The Web page file 18 is of a directory structure, and includes an open directory 19 and a protected directory 20.

Figure 3:
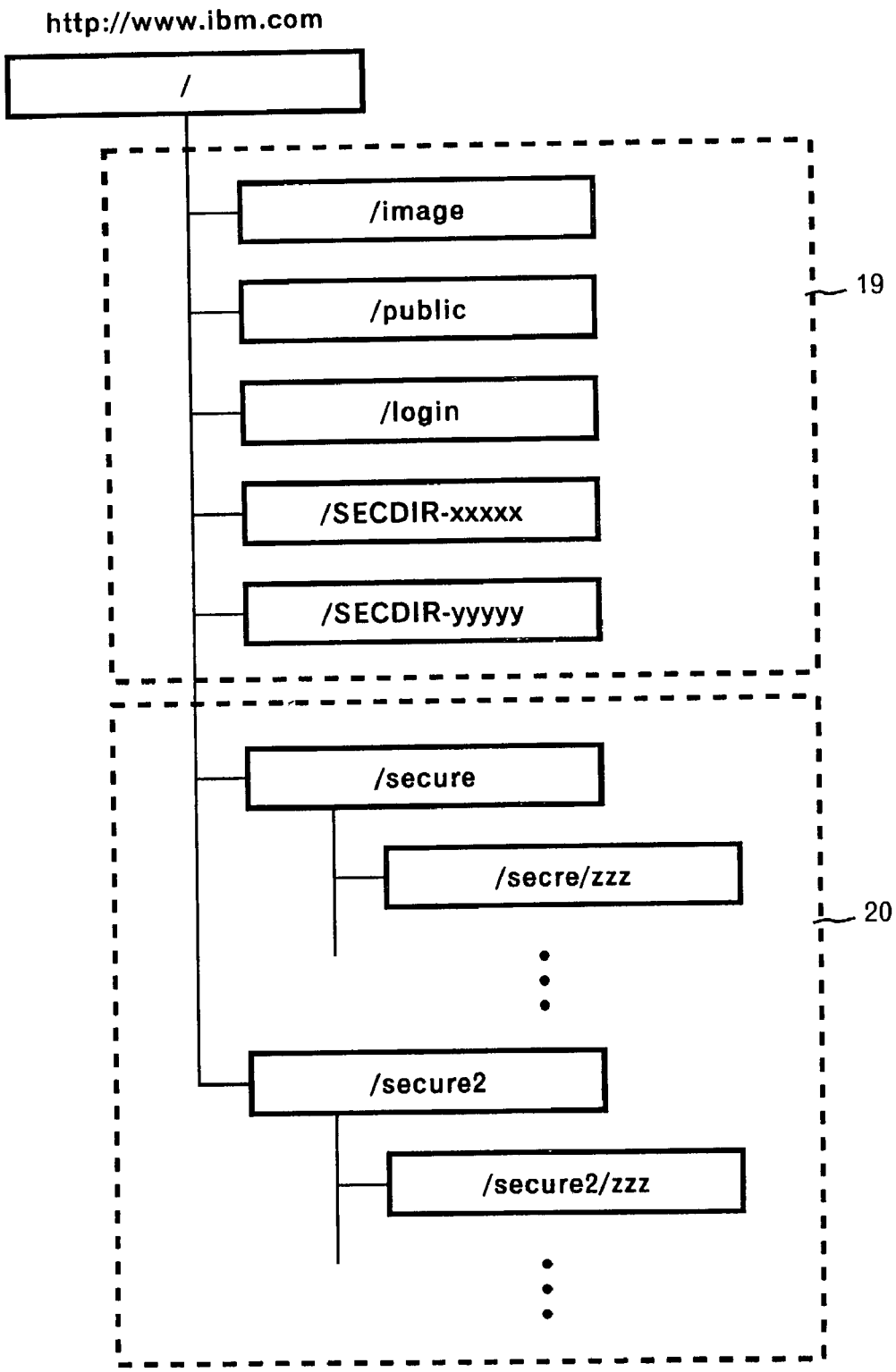
FIG. 3 is a conceptional view showing an example of a directory structure of an open directory 19 and a protected directory 20.

FIG. 3 is a conceptional view showing an example of the directory structure of the open directory 19 and the protected directory 20. The open directory 19 and the protected directory 20 are provided below a root directory indicated by a slash, "/". The open directory 19 is a directory having no access restriction from an outside and is generally open to public. For example, an image data file used in the Web page is recorded below a directory indicated by "/image". A general-use file open to public is recorded below a "/public" directory. A file needed for login processing is recorded below a "/login" directory. Also, "/SECDIR-xxxx" and "/SECDIR-yyyy" are virtual directories. These directories are not actually present, and as will be described below, are replaced with physical directories. The protected directory 20 is a directory that restricts direct accesses from an outside, and has actually recorded a resource, or namely, the object of a request from the user. As shown in the drawing, a "/secure" or "/secure2" directory is placed at the same depth as the "/SECDIR- . . . " directories, and directories below the same are arranged arbitrarily. When a hyperlink is bridged to another physical directory below the "/secure" or "/secure2" directory from a page file at or below the "/secure" or "/secure2", the resource of a link destination is specified by a relative directory. By writing the resource as the relative directory, even if the parent directory name is replaced with a virtual directory name, it is not necessary to change the resource name (directory name) of a hyperlink for each parent directory name among page files written in the relative directory at or below the parent directory ("/secure" or "/secure2"). Consequently, not only can an already constructed Web page file be used, but also a page file can be constructed more readily.

In FIG. 2, the Web page file 18 is illustrated as being recorded within the server system 10. However, the Web page file 18 is not necessarily recorded within the server system 10 and it may be recorded within another system connected via a communications network, such as an internet. However, it is necessary that where the Web page file 18 is recorded can be specified by adequate address specifying means, such as an IP address. Also, examples of a physical recording medium for the Web page 18 would be a hard disc drive, an optical or magneto-optical recording medium, such as a CD-ROM and a DVD-ROM, a magnetic tape, and a semiconductor device.

Figure 4:
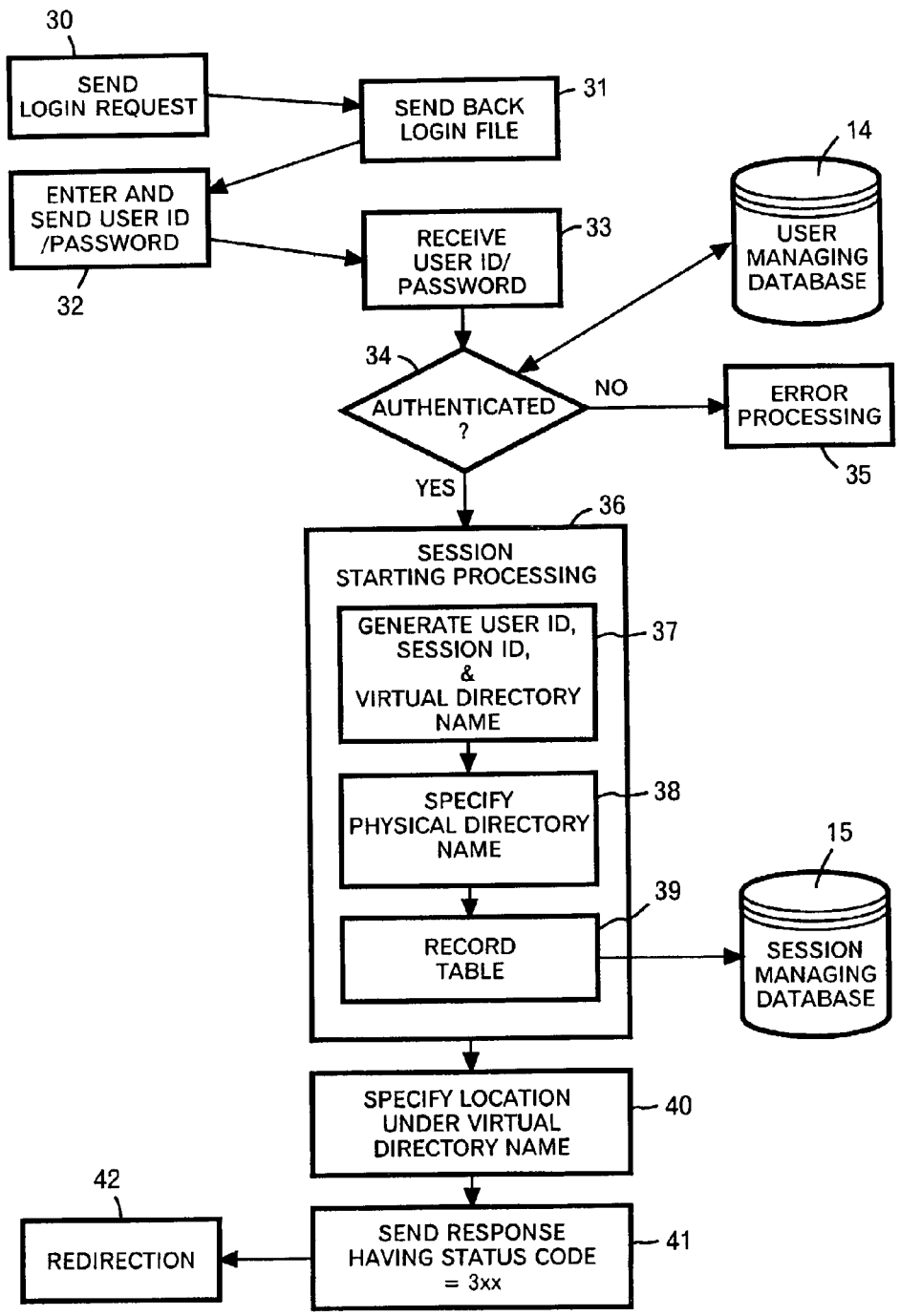
FIG. 4 is a flowchart detailing an example of the instructions when a session is started by the session managing method of the first embodiment.

FIG. 4 is a flowchart detailing an example of the instructions when a session is started by the session managing method of the present embodiment. In FIG. 4, processing in each box in the left side represents an operation or processing in the client system 11, and processing in each box in the right side represents processing in the server system 10.

Initially, the client system 11 (hereinafter, occasionally referred to simply as the client) sends a login request to the server system 10 (hereinafter, occasionally referred to simply as the server)(Step 30). The login request is, for example, a GET request for a particular file recorded at or below the "/login" directory in the server system 10. Upon receipt of the login request, the server system 10 sends a login file back to the client (Step 31). The login file has an input field where the user enters, for example, his ID for user identification and his password for authentication. Upon receipt of the login file, the client system 11 displays a login screen so that the user enters the necessary particulars into the aforementioned field, and then returns the login file to the server (Step 32). Upon receipt of the user ID and password (Step 33), the server authenticates the user identification by referring to the user managing database 14 (Step 34). When the server succeeds in authentication, it handles the session starting processing in Step 36, and when it fails, it handles error processing (Step 35).

The session starting processing (Step 36) includes the following steps. Firstly, the server creates a user ID, a session ID, and a virtual directory name (Step 37). The user ID may be the user ID used in the authentication. The session ID is an ID for distinguishing a session to be started from a currently effective session, and is assigned with a number other than the number assigned to the already issued and currently effective session ID. The virtual directory name is a name of an imaginary directory associated with the session ID. In the present embodiment, the user is tracked under this virtual directory name when he moves from one page to another. Also, the virtual directory name is denoted as the aforementioned "/SECDIR-xxxx", which is composed of a portion "SECDIR-" identifying itself as a virtual directory name and a portion "xxxx" generated for each session. The portion generated for each session is a combination of characters, numerics, and marks, and has a sufficient length. It uniquely represents one particular user at least during the session effective period, and any other third party cannot readily figure it out. Consequently, it is possible to prevent a duplication of a virtual directory during the session effective period, and it is also possible to prevent any other user from accessing to a Web file a particular user is referring to in a particular session, either intentionally or unintentionally.

Then, the server specifies the physical directory name having recorded an entity of the page file the user is trying to access (Step 38). For example, in the case shown in FIG. 3, the physical directory name is the "/secure" directory or the "/secure2" directory. Then, the server records the user ID, the session ID, the virtual directory name, and the physical directory name associated with one another in a table (Step 39). Table 1 below shows an example of the table thus created.

TABLE 11

| User ID | Session ID | Virtual Directory Name | Physical Directory Name |
|---|---|---|---|
| User A | 123678 | /SECDIR-X03M01qnZdYdgyfeuIPmQ | /secure |
| User B | 123686 | /SECDIR-Gh3JHJBzJcaScd3wyUS8cq | /secure |
| User C | 123694 | /SECDIR-5SmpzqSnK0ucWCix0ykETA | /secure2 |

As has been discussed, because the server can control which user is trying to access which physical directory at the login stage, the server can operate flexibly by, for example, providing services customized to each user. The table thus created is recorded in the session managing database 15.

Then, the server specifies the location of the access file (resource) under the virtual directory name (Step 40), and sends a response back to the client after it has set a status code in 300's, so that client can use the same as a redirect request (Step 41). Upon receipt of the response, the client redirects to the resource at the specified location, that is, an URI (Uniform Resource Identifier) written in the virtual directory name (Step 42). Hence, a request from the client thereafter is processed by way of the virtual directory, which allows the server to implement the session management by referring to this directory name as needed.

In the session starting processing in the present embodiment, the authentication processing in Steps 31 through 34 is not a must. The server may start the session starting processing (Step 36) unconditionally at a session starting request (first request) from the user by skipping such authentication.

Figure 5:
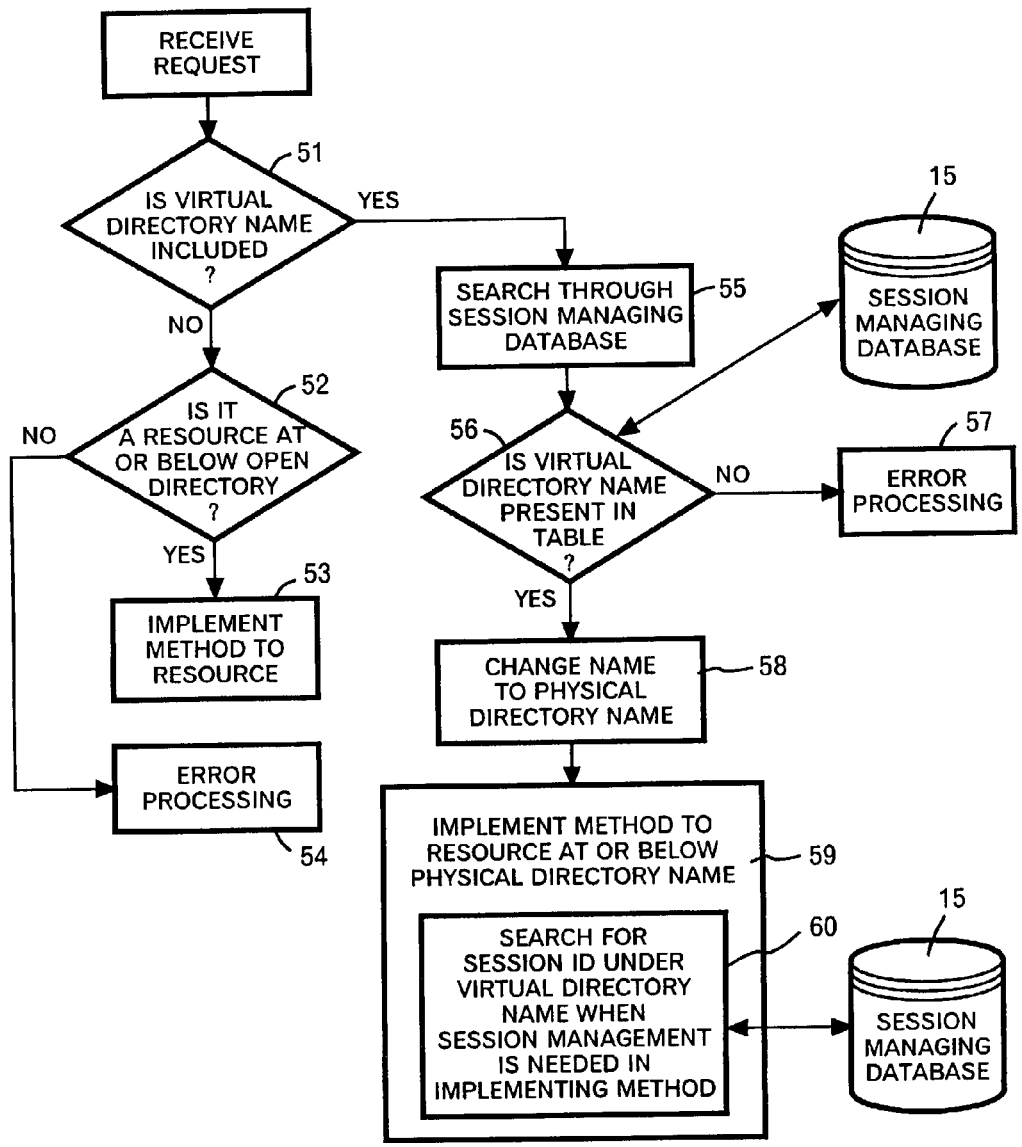
FIG. 5 is a flowchart showing an example of the instructions how a request is processed at the server's end by the session managing method of the first embodiment.

FIG. 5 is a flowchart detailing an example of how a request is processed at the server's end by the session managing method of the present embodiment. Upon receipt of a request from the user, the server decides whether the resource in the request includes a virtual directory name (Step 51). Whether a virtual directory name is included or not can be readily decided by deciding whether a keyword, "/SECDIR-" representing the virtual directory name, is included or not. In case that the virtual directory name is included, the server proceeds to Step 55 and onwards; otherwise, the server makes a judgment in Step 52. In Step 52, the server decides whether the resource in the request is a resource recorded at or below the open directory. When the resource is found at or below the open directory, the server implements the method to the resource (Step 53). For example, in the case of the GET method, the server obtains the resource and sends the same back to the client. When the server fails in finding the resource, the server handles error processing (Step 54).

Upon deciding that the virtual directory name is included in Step 51, the server extracts the virtual directory name and searches through the session managing database 15 (Step 55). Then, the server decides the presence of the virtual directory name in the aforementioned table in the session managing database 15 (Step 56). Upon deciding the absence, the server handles error processing (Step 57), and upon deciding the presence, the server replaces the virtual directory name with the corresponding physical directory name recorded in the table (Step 58). For example, in the case of Table 1 above, if the URL of the root directory in a request from the user A is "//www.ibm.com", then, the HTTP request will be "http://www.ibm.com/SECDIR-X03M01qnZdYdgyfeu1PmQ/index.html". Hence, the server replaces the virtual directory name, "/SECDIR-X03M01qnZdYdgyfeu1PmQ", with the physical directory name in Table 1, "/secure". In short, the server converts the HTTP request to "http://www.ibm.com/secure/index.html".

The resource converted in this manner is an entity actually recorded in the server system 10, and the server implements a certain method with respect to the resource of the physical directory (Step 59). If the server needs to refer to the session ID when implementing the method, the server can obtain the session ID by referring to the session managing database 15 (Step 60). As has been described, according to the method of the present embodiment, it is possible to implement the session management as needed by referring to the virtual directory name. The server may merely read out the resource (page file) and send the same back to the client as a result of the implemented method. However, it goes without saying that the server may dynamically create a page as well.

Figure 6:
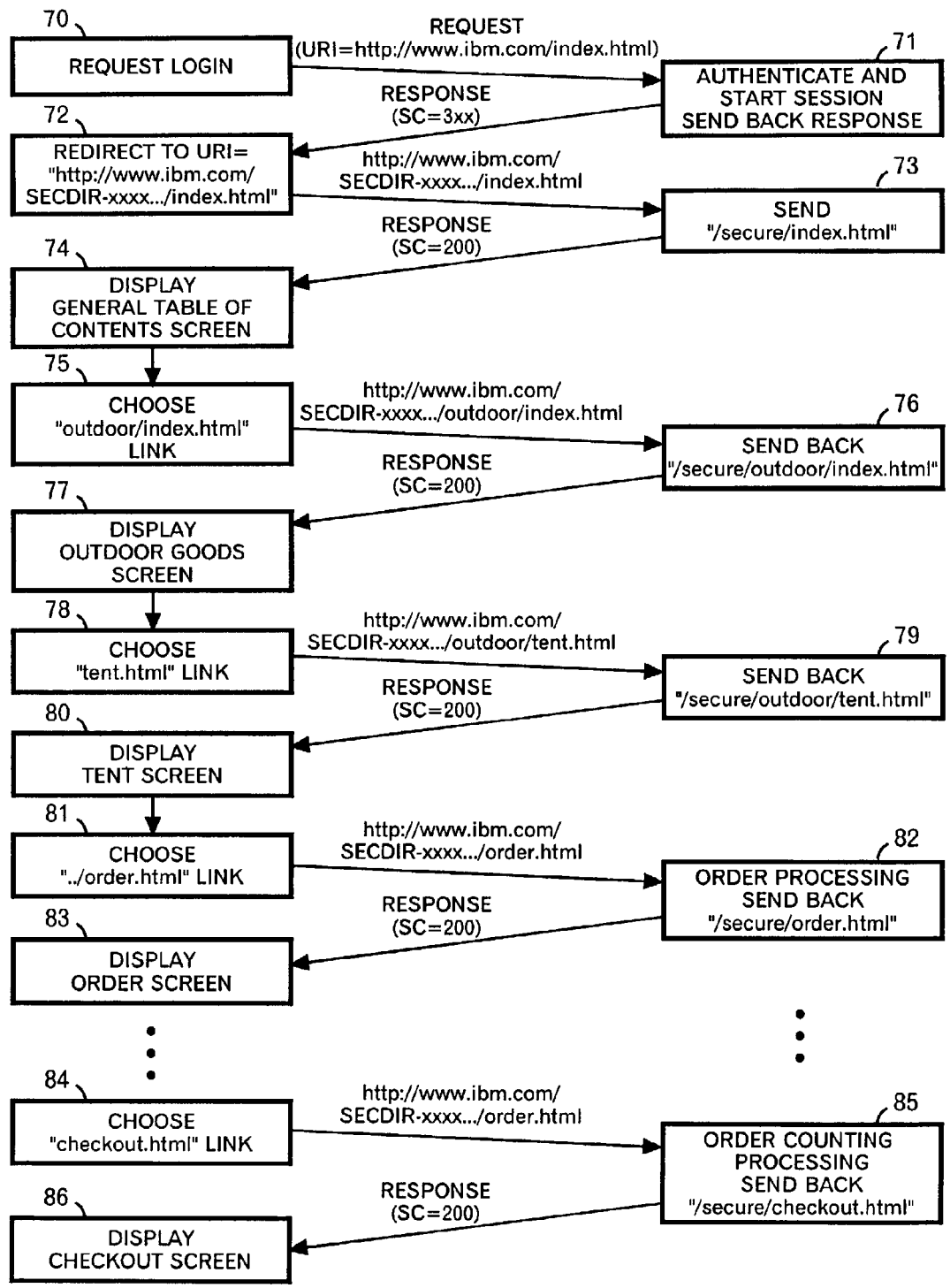
FIG. 6 is a view showing an example of the processing when the method of the first embodiment is applied to Internet shopping.

FIG. 6 is a view showing an example of the processing when the method of the present embodiment is applied to Internet shopping. In the drawing, processing in each box in the left side represents processing at the client's end, and processing in each box in the right side represents processing at the server's end.

Initially, the client originates a login request (Step 70). The URI included in the request at this point is, for example, a URL ="http://www.ibm.com/indx.html". Assume that the resource of the URI is recorded below the aforementioned login directory. Upon receipt of the request, the server handles the login processing as described above, and starts a session (Step 71). A response from the server is a response having a status code "3xx" including "http://www.ibm.com/SECDIR-xxxx . . . /index.html" as the location. Because the received response has a status code "3xx" and an URI is specified as its location, the client redirects to this URI (Step 72). In short, the client originates a GET request to "http://www.ibm.com/SECDIR-xxxx . . . /index.html". The session starts at this instant. Upon receipt of the request, the server converts the address (changes the directory name) and obtains "/secure/index.html" and sends the same back to the client (Step 73). The status code at this point is "200". Then, the client receives "/secure/index.html" and displays the same (Step 74). The page is, for example, a general table of contents of an Internet shopping site. A series of the HTTP request and the response are completed with one transaction and the connection on the protocol is disconnected.

Then, assume that the user chooses an "outdoor/index.html" link (outdoor goods) within the general table of contents page. Because the hyperlinks within the page are written in relative paths, at the instant the "outdoor/index.html" link is chosen, the browser at the client originates the following HTTP request without changing the parent directory (Step 75).

Upon receipt of the request "http://www.ibm.com/SECDIR-xxxx . . . /outdoor/index.html", the server changes the address as described above, and obtains a "/secure/outdoor/index.html" file, and sends the same back to the client (Step 76). Upon receipt of the "/secure/outdoor/index.html" file, the client displays an outdoor goods page (Step 77). Herein, the connection is also disconnected the instant the transaction for a series of the request and the response at this stage is completed. However, it is readily understood by referring to the virtual directory name that the request originated in Step 75 is a request following the request (redirect) originated in Step 72 from the same user.

On the other hand, according to the present embodiment, it is possible to track the user without using cookies or embedding user information or session information in the hyperlinks.

Likewise, if the user chooses "tent.html." (tent screen) written in the relative path embedded in the outdoor goods page (Step 78), the client originates a request "http://www.ibm.com/SECDIR-xxxx . . . /outdoor/tent.html", and the server changes the address and sends a "/secure/outdoor/tent.html" file back to the client (Step 79). The client receives the same and displays the tent screen (Step 80).

Assume that the user is going purchase this tent. In this case, he chooses a ". . . /order.html" link with a specified relative path. Herein "." indicates a parent directory relatively one directory above. Because the relative path is specified, the client originates a request "http://www.ibm.com/SECDIR-xxxx . . . /order.html" by leaving the portion "http://www.ibm.com/SECDIR-xxxx . . . /" intact (Step 81) The server converts the address in the same manner as above, and sends a "/secure/order.html" file back to the client (Step 82). At this point, the server needs to know from whom the order is made. Hence, the server has to identify the user and record the order contents in a shopping cart. The server can identify the user by searching for the virtual directory name with reference to the session managing database 15.

Assume that the user has repeated the processing of a series of the request and the response as many times as necessary, and chooses checkout processing "checkout.html". Then, because the relative path is specified, a description indicating a relation with the parent direction may be inserted before the file name in the hyperlink to be exact. The above example is a case where the current directory is "/SECDIR-xxxx . . . /". Hence, a request from the user is originated to "http://www.ibm.com/SECDIR-xxxx . . . /checkout.html", and the server handles order counting processing (Step 85). It is needless to say that the server refers to the virtual directory "/SECDIR-xxxx . . . " and identifies the session ID and the user when handling the order counting processing. The server creates a "/secure/checkout.html" file as a dynamic page, and sends the same back to the client as the result of order processing (Step 85). Then, the client displays the same as a checkout screen (Step 86). The session is completed if the user tries to refer to a file above the "/SECDIR-xxxx . . . " thereafter. As long as the user makes manipulations below the "/SECDIR-xxxx . . . ", he can continue arbitrary processing as being in the same session.

According to the session managing system and method of the present embodiment, the session management is implemented with the virtual directory name included in the URI. Hence, it is not necessary to include the user information or session information in the hyperlink within the page file. It is not necessary to dynamically create a hyperlink such that includes the user information or session information, either. As a result, a load to the server can be reduced and the size of the page file can remain the same. Hence, it is possible to reduce a communications load applied when a page file is transferred. Also, according to the present embodiment, the page file may be a static file. However, as has been described above, the hyperlink within the page file has to be written in the relative path. Writing a hyperlink in the relative path is a general technique used when constructing a Web, and does not increase burdens of a Web designer in constructing a Web. As has been described above, the Web server of the present embodiment can implement the session management with a static page file, and therefore, when there already exist constructed static pages, a system that needs the session management can be readily constructed by using the already constructed static pages.

The present embodiment uses both the user ID and the session ID for the session management, but the session management is possible by using only one of these IDs.

The virtual directory in the present embodiment may be deleted when the session management is completed, but it may be held effectively for a certain period. In this case, the user may record the URI under the virtual directory name in the "Favorites" or "Bookmark", so that he can start the service by skipping the login processing. The server can arbitrarily set the effective period of the virtual directory name, which allows the server to operate flexibly.

The above example described a case where a user accesses a physical file at or below the "/secure", but any other user may refer to a file at or below the same physical directory name at the same time. Alternatively, it may be arranged so that the other users access a file at or below a different physical directory name (for example, "secure2"). Hence, it is possible to arrange in such a manner that an accessed physical file varies from user to user, which makes the invention applicable to a flexible operation of the server, such as providing services customized to each user.

Figure 7:
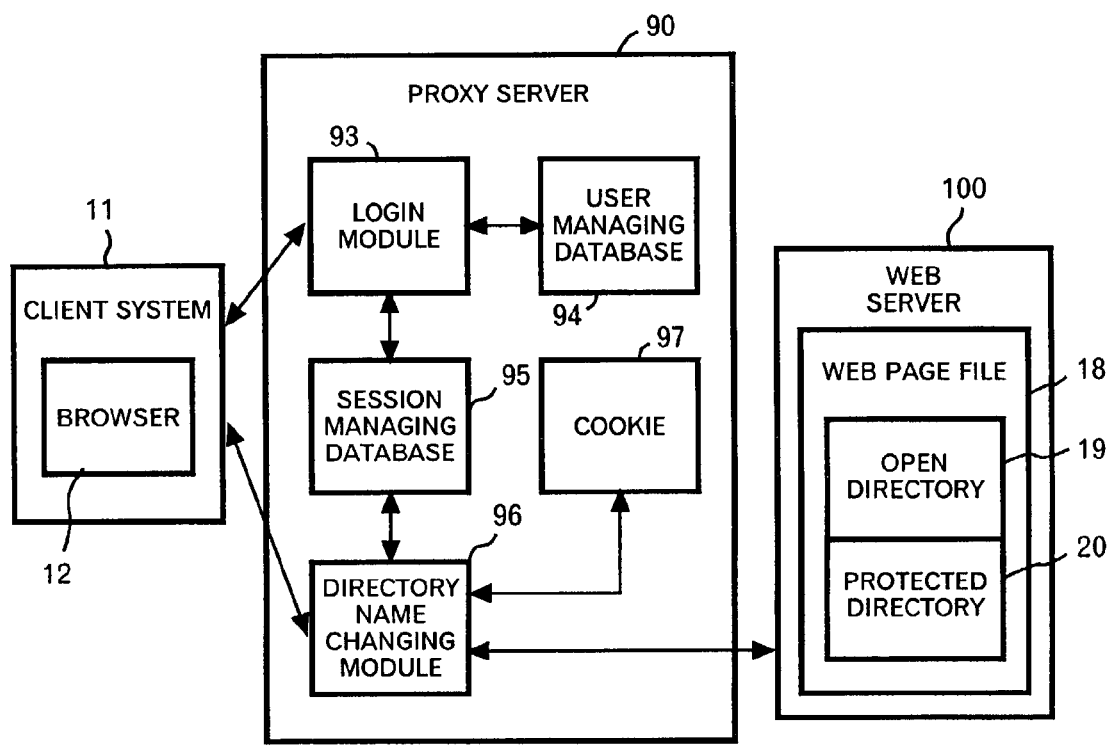
FIG. 7 is a block diagram showing an example of a system arrangement when the invention is achieved by a proxy server.

FIG. 7 is a block diagram showing an example of a system arrangement when the invention is achieved by a proxy server as another embodiment. Herein, the client system 11, and a login module 93, a user managing database 94, a session managing database 95, and a directory name changing module 96 in a proxy server 90 are arranged in the same manner as their respective counterparts in the first embodiment. Also, a Web page file 18 in a Web server 100 is the same as its counterpart in the first embodiment.

The proxy server 90 of the present embodiment has a cookie 97 referred to by the directory name changing module 96.

Figure 8:
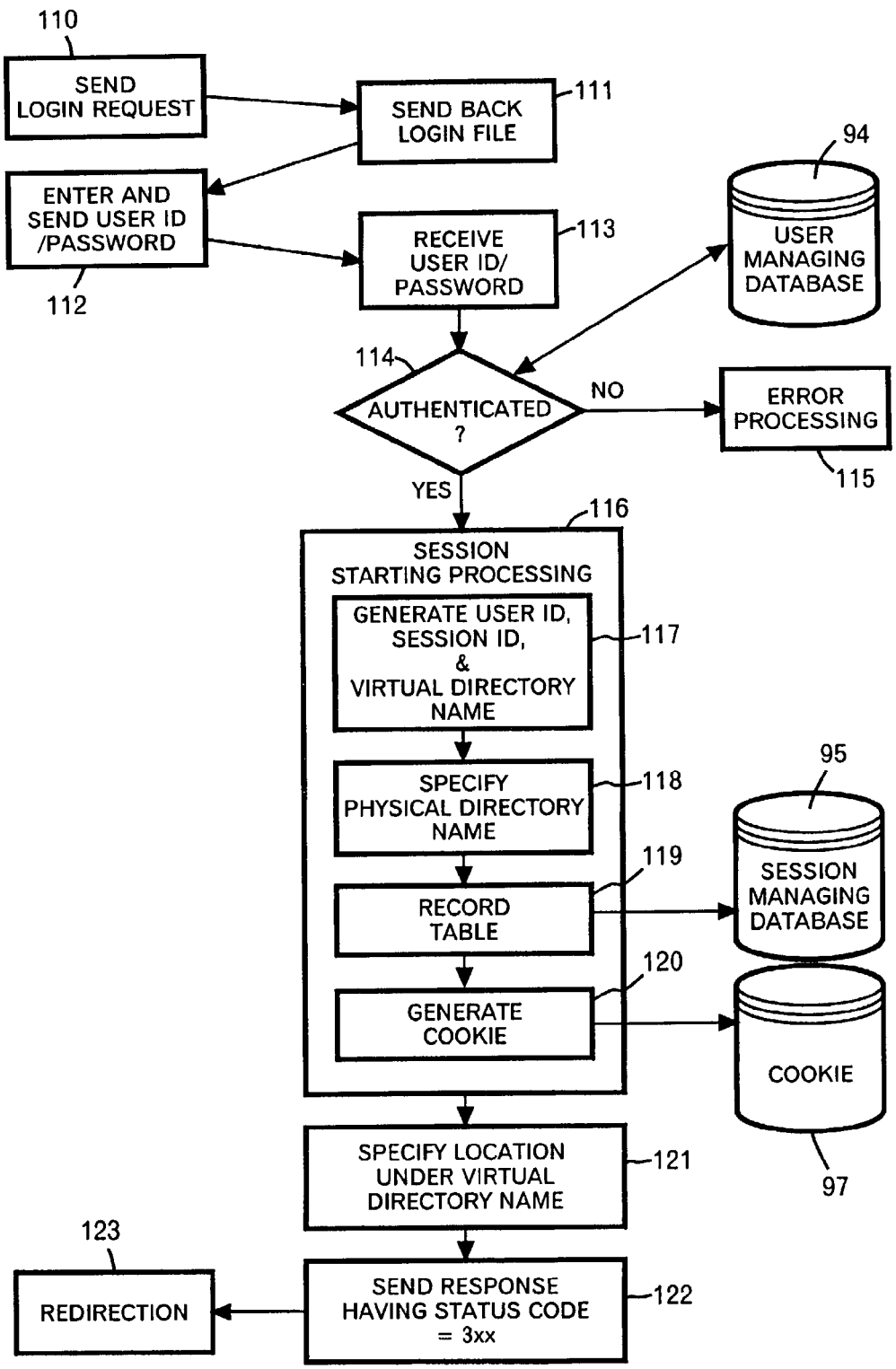
FIG. 8 is a flowchart detailing an example of the instructions when a session is started by a session managing method of a second embodiment.

FIG. 8 is a flowchart detailing an example of the instructions when a session is started by the session managing method of the present embodiment. Processing in Step 110 through Step 119 is the same as the corresponding processing in the first embodiment except that the processing is not handled by the Web server but by the proxy server 90. Also, according to the present embodiment, a cookie is generated for each virtual directory name after the table is created (Step 120). Each cookie thus generated is recorded as cookie information 97.

Step 121 through Step 123 are the same as their corresponding steps in the first embodiment.

Figure 9:
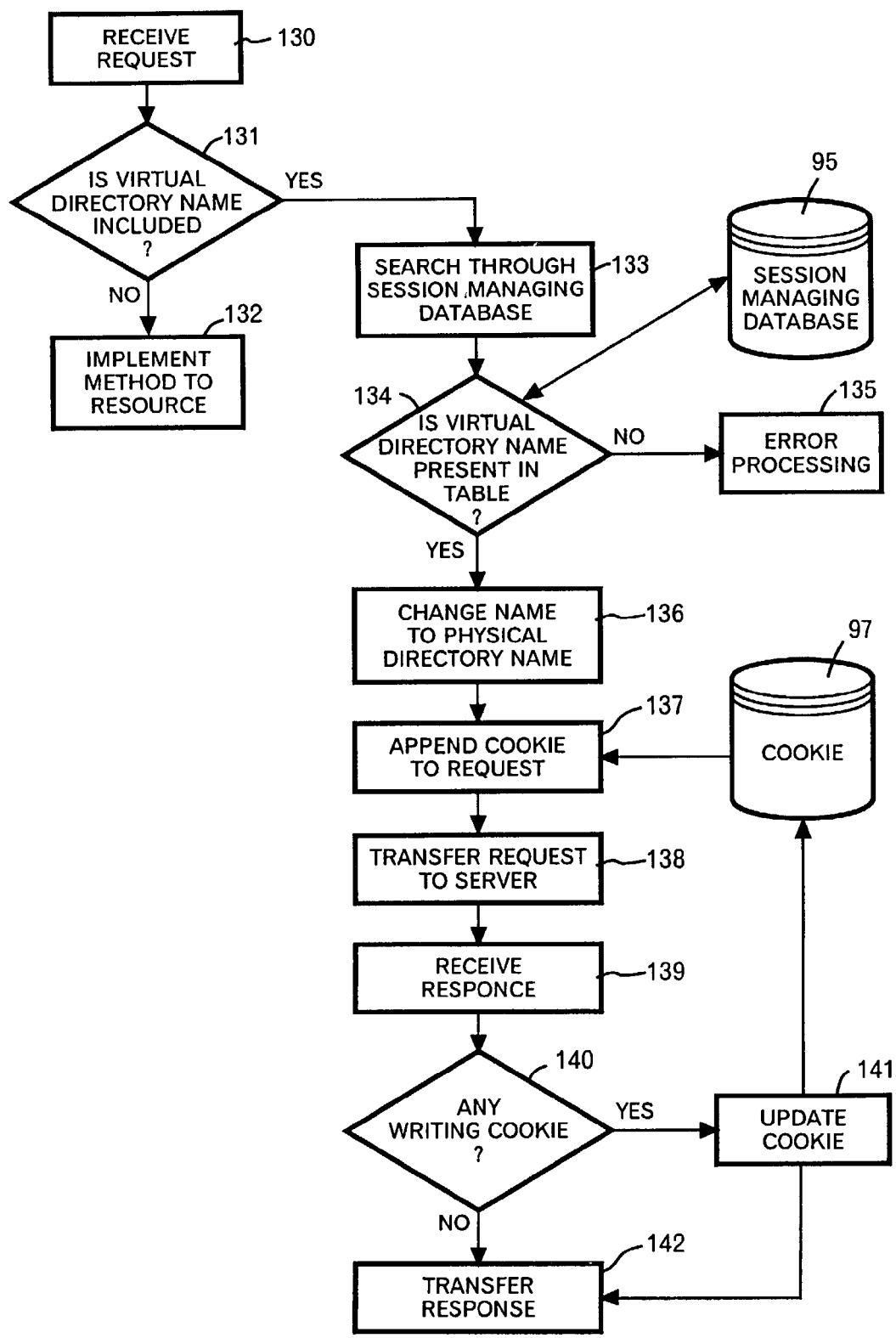
FIG. 9 is a flowchart showing an example of the instructions how the proxy server processes a request by the session managing method of the second embodiment.

FIG. 9 is a flowchart detailing an example of the instructions how the proxy server processes a request by the session managing method of the present embodiment. Processing in Step 130 through Step 136 is substantially the same as the corresponding processing in the first embodiment. However, upon deciding that the virtual directory name is not included in Step 131, the proxy server 90 implements the method to the resource by the URI without changing the directory name (Step 132). Herein, the presence or absence of the resource is decided not by the proxy server 90 but by a server to which the resource is requested.

In Step 136, after the proxy server 90 changes the virtual directory name to the physical directory name in the same manner as in the first embodiment, it appends a cookie to the request (Step 137). The cookie is generated at the beginning of the session, and the contents thereof are recorded in advance by a notice from the server 100.

The proxy server 90 transfers the request appended with the cookie to the server 100 (Step 138). Upon receipt of the request, the server 100 implements a certain method. Because the cookie information is appended to the request, the server 100 can implement the session management normally by referring to the cookie information. The server 100 returns the result of the processing to the proxy server 90 as a response.

Upon receipt of the response from the server 100 (Step 139), the proxy server 90 decides whether the cookie is changed (Step 140). When the cookie is changed, the proxy server 90 updates the contents of the cookie (Step 141), and then transfers the response to the client (Step 142). The contents of the cookie do not have to be deleted from the response at this stage, but in order to reduce a communications load, it is preferable to do so.

According to the present embodiment, the proxy server 90 implements the session management with the client. The present embodiment is the same as the first embodiment in that a virtual directory name is used for the session management. In the present embodiment, however, the proxy server 90 holds a cookie in association with the virtual directory name. Hence, when viewed from the client, the proxy server 90 seems to refer to the URI in the virtual directory name. On the other hand, when viewed from the server 100, the proxy server 90 seems to receive a request from a client having a cookie. As has been described, the session managing method or system of the invention can be achieved by a proxy server. The proxy server may be replaced with a gateway or the like.

The above description described in detail the invention devised by the inventor by way of embodiments. It should be appreciated, however, that the invention is not limited to the embodiments above, and can be modified in various manners without deviating from the scope of the invention.

The present invention provides an extremely simple session managing method. Also, it provides a session managing method capable of using a static page. In addition, it provides a session managing method for minimizing burdens in reconstructing an already constructed Web site. Further, it is possible to provide a session managing method for reducing a load to a server. Furthermore, it is possible to provide a session managing method that does not increase the size of a Web page. Moreover, it is possible to provide a session managing method that can be readily achieved in a function-limited environment, such as an i-mode portable terminal.

What is claimed:

1. A session managing method for performing processing to a resource on a network, comprising:
   a step of receiving a request for said processing from a user system;
   a step of deciding whether a virtual directory name is included in a resource which is to be an object of said request;
   a step of replacing the virtual directory name with a physical directory name recorded in association with the virtual directory name on condition that the virtual directory name is decided as being included in said deciding step; and
   a step of sending a result of said processing to the resource replaced by the physical directory name back to the user system as a response,
   wherein, if necessary, one or both of user identification information and session identification information recorded in association with the virtual directory name are referred to for generating the response.

2. The session managing method according to claim 1, further comprising, prior to said step of receiving a request for said processing from a user system, a step of starting a session in response to a request from the user system, wherein said session starting step includes:

a step of issuing a virtual directory name;

a step of recording, by associating one with another, one or both of the session identification information and the user identification information, the virtual directory name, and a physical directory name having recorded a resource that should respond to the request for starting the session;

a step of replacing the physical directory name with the virtual directory name; and a step of generating a response including location information of the resource replaced by the virtual directory name, wherein the user system having received the response including the location information redirects to the resource specified by the location information.

3. The session managing method according to claim 1, wherein the virtual directory name uniquely represents one particular user system during a predetermined effective period.

4. The session managing method according to claim 1, wherein the a direct access from outside the resource under the physical directory name is restricted.

5. A session managing system for performing processing to a resource on a network, comprising:

means for receiving a request for said processing from a user system;

means for deciding whether a virtual directory name is included in a resource which is to be an object of said request;

means for replacing the virtual directory name with a physical directory name recorded in association with the virtual directory name if said deciding means decides that the virtual directory name is included; and means for sending a result of said processing to the resource replaced by the physical directory name back to the user system as a response, wherein, if necessary, one or both of user identification information and session identification information recorded in association with the virtual directory name are referred to for generating the response.

6. The session managing system according to claim 5, further comprising means for starting a session in response to a request from the user system, wherein said session starting means includes:

means, for issuing a virtual directory name other than an already issued virtual directory name;

means for recording, by associating one with another, one or both of the session identification information and the user identification information, the virtual directory name, and a physical directory name having recorded a resource that should respond to the request for starting the session;

means for replacing the physical directory name with the virtual directory name; and means for generating a response including location information of the resource replaced by the virtual directory name, wherein the user system having received the response including the location information redirects to the resource specified by the location information.

7. The session managing system according to claim 5, wherein link information included in the resource under the physical directory name is written by using a relative path.

8. A computer program product, in a computer-readable medium for performing processing to a resource on a network system, comprising:

instructions for receiving a request for said processing from a user system;

instructions for deciding whether a virtual directory name is included in a resource that becomes an object of said request;

instructions for replacing the virtual directory name with a physical directory name recorded in association with the virtual directory name if the virtual directory name is decided as being included in said deciding instructions; and instructions for sending a result of said processing to the resource replaced by the physical directory name back to the user system as a response, wherein, if necessary, one or both of user identification information and session identification information recorded in association with the virtual directory name are referred to for generating the response.

9. The computer program product according to claim 8, further comprising instructions for starting a session in response to a request from the user system, wherein said session starting instructions includes:

instructions for issuing a virtual directory name;

instructions for recording, by associating one with another, one or both of the session identification information and the user identification information, the virtual directory name, and the physical directory name having recorded a resource that should respond to the request for starting the session;

instructions for replacing the physical directory name with the virtual directory name; and instructions for generating a response including location information of the resource replaced by the virtual directory name, wherein the user system having received the response including the location information redirects to the resource specified by the location information.

* * * * *